United States Patent
MacGuinness

(10) Patent No.: US 7,795,162 B2
(45) Date of Patent: Sep. 14, 2010

(54) FABRIC FOR AN ANIMAL RUG

(76) Inventor: Thomas Peter MacGuinness, Circle T Ranch, Little Road, Dromiskin, County Louth (IE)

( * ) Notice: Subject to any disclaimer, the term of this patent is extended or adjusted under 35 U.S.C. 154(b) by 0 days.

(21) Appl. No.: 11/349,270

(22) Filed: Feb. 8, 2006

(65) Prior Publication Data
US 2006/0194491 A1    Aug. 31, 2006

(30) Foreign Application Priority Data
Feb. 10, 2005    (IE)    ................ S2005/0063

(51) Int. Cl.
*D03D 9/00* (2006.01)
*D03D 15/00* (2006.01)
*B68C 5/00* (2006.01)

(52) U.S. Cl. .............. 442/217; 442/2; 442/5; 54/79.1; 54/79.4; 54/80.4

(58) Field of Classification Search ........ 119/28.5, 119/526, 850; 442/5, 243, 2, 4, 14, 49, 217; 54/79.1, 79.4, 80.4; 28/151
See application file for complete search history.

(56) References Cited

U.S. PATENT DOCUMENTS

| 5,965,467 | A |   | 10/1999 | Stevenson et al. |
| 6,050,068 | A | * | 4/2000 | White, Jr. ............... 54/80.2 |
| 2002/0043054 | A1 | * | 4/2002 | Gatto ..................... 54/79.4 |

FOREIGN PATENT DOCUMENTS

| GB | 2 174 728 A |   | 11/1986 |
| JP | 2003-201639 | * | 7/2003 |
| JP | 2003-201639 A |   | 7/2003 |
| JP | 2003-201640 A |   | 7/2003 |

* cited by examiner

*Primary Examiner*—D. Lawrence Tarazano
*Assistant Examiner*—Matthew D Matzek
(74) *Attorney, Agent, or Firm*—Birch, Stewart, Kolasch & Birch, LLP.

(57) ABSTRACT

A fabric (10) for an animal rug, having a mesh pattern of a size suitable for preventing penetration and biting by insects, has a mesh of woven fibers (11), forming rectangular spaces (12) therebetween. Each weft (13) and warp (14) is formed from a soft, inner, multifilament fiber (15) sandwiched between a pair of relatively stiffer, outer, monofilament fibers (16). The fabric (10) is strong and stable, yet soft and light, and it is also absorbent. The outer, monofilament fibers provide the stability of the mesh pattern by locking the soft, inner, multifilament fiber (15) in place. However, a certain amount of movement between the wefts and the warps is possible resulting in a fabric, which will mould around the body of the animal.

7 Claims, 1 Drawing Sheet

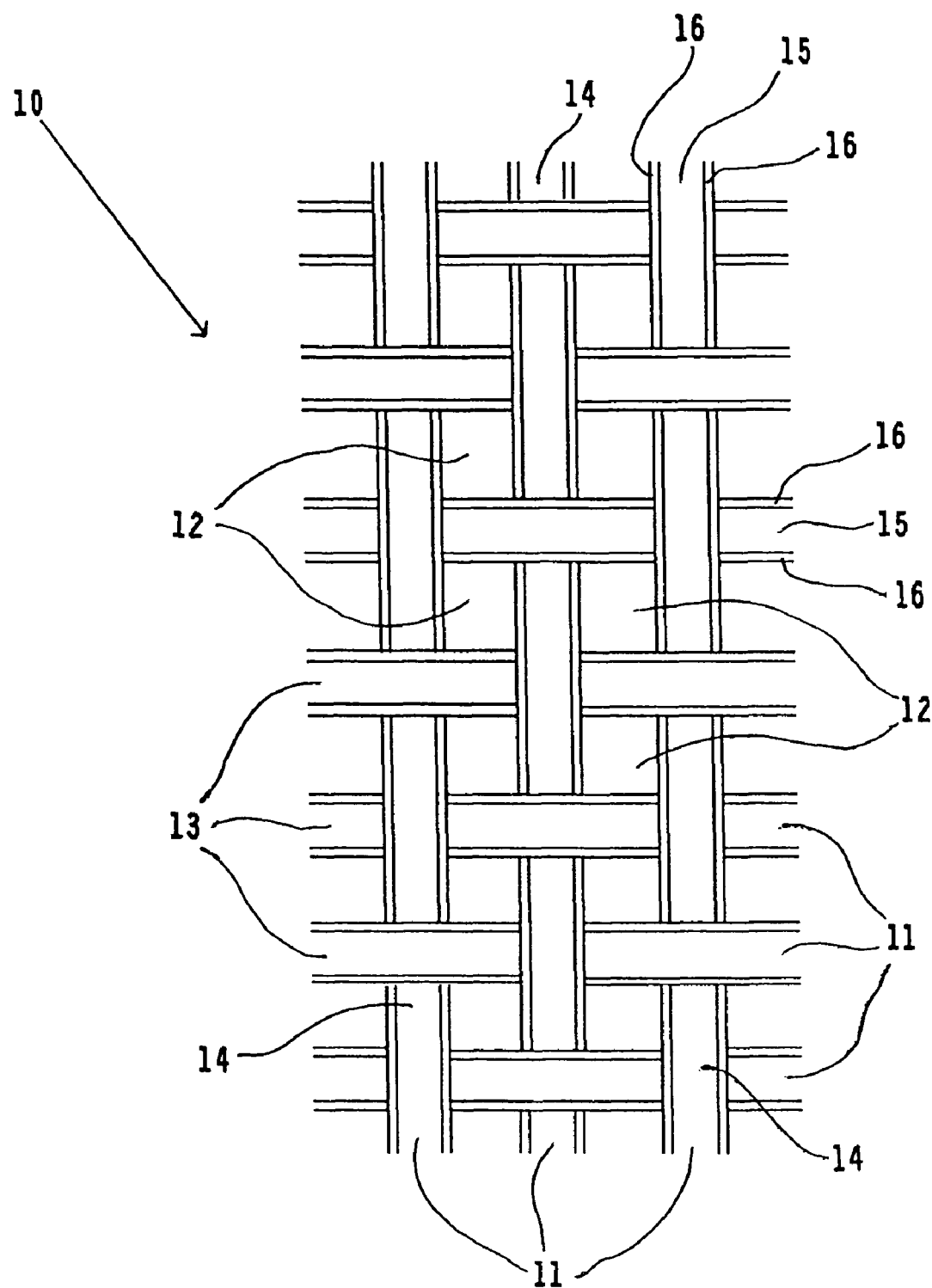

FABRIC FOR AN ANIMAL RUG

FIELD OF THE INVENTION

This invention relates to a fabric for an animal rug and, in particular, to a fabric having a mesh pattern of a size suitable for preventing penetration and biting by insects.

By animal rug herein is meant any covering for an animal such as a blanket or a rug, hereinafter referred to collectively as an animal rug.

By a fabric having a mesh pattern herein is meant a woven, knitted, or knotted fabric that has an open texture with evenly spaced holes therein.

BACKGROUND OF THE INVENTION

Rugs of this type have been shown to be beneficial when used for protecting horses, in particular, from the irritation and possible harmful effects of insect bites. Some horses develop a hypersensitivity to the bites of flies, especially the midge, a small gnat-like fly especially of the family Chironomidae, and this results in the development of a condition known as sweet itch. The skin of the horse becomes itchy and it attempts to relieve the itchiness by rubbing, resulting in the development of bare patches, especially in the areas of the mane and dock. This can also result in a loss of condition.

The rugs are normally worn by the animal outdoors in warm weather, when the insects are active. Thus, the rug needs to be light, soft, and strong, and needs to allow for maximum ventilation of the animal's skin, while still preventing insect bites.

One type of rug, used in the equine field, is manufactured from a knitted fabric, with the knots forming gaps therebetween in a mesh pattern. The rug is light and soft and prevents insect bites. However, it is difficult to design a rug having these properties while at the same time being strong enough to withstand the wear and tear resulting from use. By its nature, once a hole forms in this type of fabric it tends to result in a tear.

Another fabric used in rugs of this type is Textiline (Textiline is a trade mark of the Twitchell Corporation). Textiline is a polyvinylchloride (PVC) coated polyester fabric. The Textiline is woven into a loose mesh, which is then heated so that the PVC softens. The fabric is then rolled and the mesh is bonded together to form a strong and stable mesh pattern. However, the resulting fabric is stiff and is non-absorbent. It is also sensitive to the ambient temperature, being soft in hot temperatures and stiff and unwieldy in cold temperatures.

It is an object of the present invention to overcome the disadvantages of the fabrics hereinbefore described.

SUMMARY OF THE INVENTION

The present invention is directed to fabric for an animal rug having a mesh pattern of a size suitable for preventing penetration and biting by insects, wherein the fabric is made of a mesh of woven fibres, each weft and warp of which is formed from a soft, inner fibre sandwiched between a pair of relatively stiffer, outer fibres, the outer fibres being of a material suitable for maintaining the mesh pattern of the finished fabric.

BRIEF DESCRIPTION OF THE DRAWINGS

FIG. 1 shows a fabric in accordance with the invention, wherein the fabric 10 has a mesh of woven fibres 11, which form rectangular spaces 12 therebetween. Each weft 13 and warp 14 is formed from a soft, inner fibre 15 sandwiched between a pair of relatively stiffer, outer fibres 16.

DETAILED DESCRIPTION OF THE INVENTION

Thus, the invention provides a fabric for an animal rug having a mesh pattern of a size suitable for preventing penetration and biting by insects, said fabric comprising a mesh of woven fibres, each weft and warp of which is formed from a soft, inner fibre sandwiched between a pair of relatively stiffer, outer fibres, the outer fibres being of a material suitable for maintaining the mesh pattern of the finished fabric.

The fabric is strong and stable, yet soft and light, and it is also absorbent. The outer fibres provide the stability of the mesh pattern by locking the soft inner fibre in place. However, a certain amount of movement between the wefts and the warps is possible resulting in a fabric, which will mould around the body of the animal.

The inner fibre can be made from cotton, linen, nylon, polyester, polypropylene and the like. The outer fibres can be made from nylon, polyester, polypropylene and the like.

Preferably, the inner fibre is a multifilament fibre and the outer fibres are monofilaments.

The multifilament inner fibre provides considerable strength while also being soft to the touch and the monofilament to each side of the inner fibre maintains the mesh pattern.

Further, preferably, the outer fibres exhibit the property of memory, such that when the fibres are displaced they return to the original position, whereby maintaining the integrity of the mesh.

This property of memory is advantageous as, once woven into the mesh pattern the monofilaments tend to retain a crimped configuration, which assists in maintaining the mesh pattern.

The property of memory also has the advantage that a rug produced from the fabric will tend to retain its shape in use.

In one embodiment of the fabric according to the invention, the inner fibre has a denier value in the range 1000 to 1400 denier and the outer fibre has a denier value in the range 200 to 500 denier.

Preferably, the inner fibre has a denier value in the range 1100 to 1300 denier and the outer fibre has a denier value in the range 300 to 400 denier.

The ratio of multifilament to monofilament fibres is important and determines the properties of the finished fabric.

Further, preferably, the inner fibre is a polyester or polypropylene fibre.

Still, further, preferably, the outer fibre is a polyester or polypropylene fibre.

Most, preferably, the inner and outer fibres are polypropylene.

The invention will be further illustrated by the following description of an embodiment thereof, given by way of example only with reference to the accompanying drawing which is a schematic representation of a piece of fabric in accordance with the invention.

Referring to the drawing there is indicated, generally at 10, a piece of fabric in accordance with the invention, the fabric 10 having a mesh of woven fibres 11, forming rectangular spaces 12 therebetween. Each weft 13 and warp 14 is formed from a soft, inner fibre 15 sandwiched between a pair of relatively stiffer, outer fibres 16.

The soft, inner fibre 15 is a polyester multifilament fibre of 1200 denier. The outer fibre 16 is a polyester fibre of 350 denier, which exhibits the property of memory. The mesh size is 1 mm$^2$, which mesh size is maintained in the finished fabric due to the arrangement of and the properties of the fibres 11. This mesh size is large enough to provide adequate ventilation for the animal and yet small enough to prevent insects, such as the midge, from penetrating the fabric to bite the skin of the animal.

The density of the fabric is also sufficient to prevent the harmful effects of exposure to ultra violet (UV) light, such as bleaching of the animal's coat and sunburn.

The fabric 10 is woven, followed by washing, dying and heating to set a particular width of the web of woven cloth. A rug produced from the fabric 10 has the desirable properties of strength and stability coupled with softness and lightness.

What I claim is:

1. A fabric for an animal rug having a mesh pattern of a size suitable for preventing penetration and biting by insects, said fabric comprising a mesh of woven fibres, each weft and warp of which is formed from a soft, inner fibre sandwiched between a pair of relatively stiffer, outer fibres, which are woven as a single element and aligned with the surface of the fabric, the outer fibres being of a material suitable for maintaining the mesh pattern of the finished fabric; wherein the mesh size is small enough to prevent penetration by an insect having the size of a midge of the family *Chironomidae*, and wherein the fabric has sufficient movement between the wefts and warps such that the fabric is mouldable around an animal's body.

2. A fabric according to claim 1, wherein the inner fibre is a multifilament fibre and the outer fibres are monofilaments.

3. A fabric according to claim 1 or 2, wherein the inner fibre is made from a material selected from the group consisting of cotton, linen, nylon, polyester and polypropylene.

4. A fabric according to claim 1 or 2, wherein the outer fibres are made from a material selected from the group consisting of nylon, polyester and polypropylene.

5. A fabric according to claim 1 or 2, wherein the outer fibres exhibit the property of memory, such that when the fibres are displaced they return to the original position, thereby maintaining the integrity of the mesh.

6. A fabric according to claim 1 or 2, wherein the inner fibre has a denier value in the range 1000 to 1400 denier and the outer fibre has a denier value in the range 200 to 500 denier.

7. A fabric according to claim 1 or 2, wherein the inner fibre has a denier value in the range 1100 to 1300 denier and the outer fibre has a denier value in the range 300-400 denier.

* * * * *